United States Patent
Philippe et al.

(10) Patent No.: US 9,744,789 B2
(45) Date of Patent: Aug. 29, 2017

(54) THERMOCHROMIC INK COMPOSITION

(71) Applicant: FASVER, Baillargues (FR)

(72) Inventors: Eric Philippe, Eyguieres (FR); Laurence Bes, Jacou (FR)

(73) Assignee: FASVER, Baillargues (FR)

( * ) Notice: Subject to any disclaimer, the term of this patent is extended or adjusted under 35 U.S.C. 154(b) by 0 days.

(21) Appl. No.: 14/890,801

(22) PCT Filed: May 12, 2014

(86) PCT No.: PCT/FR2014/051099
§ 371 (c)(1),
(2) Date: Nov. 12, 2015

(87) PCT Pub. No.: WO2014/184482
PCT Pub. Date: Nov. 20, 2014

(65) Prior Publication Data
US 2016/0089920 A1    Mar. 31, 2016

(30) Foreign Application Priority Data

May 13, 2013 (FR) ..................... 13 54254

(51) Int. Cl.

| | | |
|---|---|---|
| *B41M 3/14* | (2006.01) | |
| *B41M 5/337* | (2006.01) | |
| *C09D 11/50* | (2014.01) | |
| *B42D 25/36* | (2014.01) | |
| *B42D 25/378* | (2014.01) | |
| *C09D 11/037* | (2014.01) | |
| *B42D 25/45* | (2014.01) | |
| *B41M 5/323* | (2006.01) | |
| *B42D 25/351* | (2014.01) | |
| *D21H 21/44* | (2006.01) | |
| *D21H 21/48* | (2006.01) | |

(52) U.S. Cl.
CPC .......... *B41M 5/3375* (2013.01); *B41M 3/142* (2013.01); *B41M 5/323* (2013.01); *B41M 5/3372* (2013.01); *B42D 25/351* (2014.10); *B42D 25/36* (2014.10); *B42D 25/378* (2014.10); *B42D 25/45* (2014.10); *C09D 11/037* (2013.01); *C09D 11/50* (2013.01); *B41M 2205/04* (2013.01); *B42D 2033/04* (2013.01); *B42D 2035/34* (2013.01); *D21H 21/44* (2013.01); *D21H 21/48* (2013.01)

(58) Field of Classification Search
CPC .... B41M 3/142; B41M 5/337; B41M 5/3372; B41M 2205/04; B41M 5/372; B42D 25/382; B42D 25/42; B42D 2035/34; C09D 11/50
USPC ........ 503/213; 106/31.16–31.22, 31.6–31.22
See application file for complete search history.

(56) References Cited

U.S. PATENT DOCUMENTS

| | | |
|---|---|---|
| 5,096,489 A | 3/1992 | Laver |
| 6,413,305 B1 | 7/2002 | Mehta et al. |
| 6,416,853 B1 * | 7/2002 | Nakashima ............ A63H 33/22 428/29 |
| 6,592,972 B1 | 7/2003 | Trantoul |
| 2005/0257880 A1 | 11/2005 | Herring et al. |

FOREIGN PATENT DOCUMENTS

| | | |
|---|---|---|
| DE | 10 2006 016048 A1 | 10/2007 |
| EP | 0 400 220 A1 | 12/1990 |
| EP | 0 678 377 A1 | 10/1995 |
| EP | 1 095 996 A1 | 5/2001 |
| EP | 1 109 675 B1 | 3/2006 |
| EP | 2 322 587 A1 | 5/2011 |
| GB | 2 197 109 A | 5/1988 |
| JP | 2002 129029 A | 5/2002 |

OTHER PUBLICATIONS

International Search Report, dated Aug. 7, 2014, from corresponding PCT application.

* cited by examiner

*Primary Examiner* — Bruce H Hess
(74) *Attorney, Agent, or Firm* — Young & Thompson

(57) ABSTRACT

A thermochromic ink composition includes, in a liquid medium, known as solvent, a dispersion of thermochromic microcapsules incorporating at least one leuco-dye and a thermoplastic binder selected from the group containing polyacrylic polyesters, polyurethanes and copolymers thereof. The composition is characterized in that the solvent is aprotic. A a method for producing a card and such a card incorporating at least one thermochromic pattern produced with a thermochromic ink composition are also described.

22 Claims, No Drawings

THERMOCHROMIC INK COMPOSITION

BACKGROUND OF THE INVENTION

Field of the Invention

The invention relates to a thermochromic ink composition intended more particularly for cards formed of a plurality of layers of at least one polymeric material—especially of polycarbonate—which are hot laminated under pressure, for synthetic papers and for security papers.

Description of the Related Art

EP0400220 describes a laminated article for identification purposes (such as an identity card) comprising two sheets or layers of PVC, at least one of which is transparent, between which there is laminated a layer comprising thermochromic liquid crystals arranged on a contrasting dark base. The liquid crystals are applied in the form of a water-based ink comprising a water-soluble polymeric binder, for example gelatin or a polyacrylamide. As indicated by this document, hot lamination under pressure of sheets of PVC bearing information causes adhesion problems. This document provides a cleaning step prior to lamination, with the aim of eliminating the chemical compounds which are assumed to impair the adhesion of the various layers to one another. Nevertheless, this article has not been exploited in practice.

Various other attempts have been made to incorporate thermochromic motifs into cards formed of a plurality of thermoplastic layers which are hot laminated under pressure. However, the known thermochromic ink compositions which are envisaged especially in these applications are compositions comprising an aqueous solvent. EP2322587 describes an example of a thermochromic ink composition which comprises microcapsules incorporating a thermochromic composition and UV absorbers dispersed in an aqueous solvent with a polymeric, for example acrylic, binder.

Moreover, a large number of cards which form data carriers and are used for identification or security purposes (bank cards, identity cards, driving licenses, cards for individual access to shared sites or transport, passport pages, etc.) are formed by hot lamination under pressure of a plurality of layers of thermoplastic material—especially of polycarbonate, which material moreover has many advantages in such applications (rigidity, durability, ease and reliability of marking (various inscriptions, security motifs, etc.), possibility of laser marking, etc.). However, the inventors have found that the thermochromic ink compositions comprising an aqueous solvent which have been proposed hitherto are not compatible with production methods by hot lamination of such layers of thermoplastic material, and in particular with the hot (temperature of approximately from 150° C. to 200° C.) lamination under pressure (approximately $2 \times 10^4$ Pa) of layers of polycarbonate. Such laminating conditions in fact destroy the thermochromic effect obtained by the thermochromic ink compositions printed on the layers of polycarbonate. Furthermore, problems of adhesion of the polycarbonate layers with one another and with the printed thermochromic compositions are irremediably found. Likewise, the known thermochromic ink compositions have a limited lifetime of at best one or two years, which is insufficient in the case of identification or security applications, for which a lifetime of at least 10 years is required (see especially ISO 24789-1,2 (2012)—"Method of evaluation of identification (ID) card service life"). The same problem arises with the synthetic papers and security papers that are used in security applications (authentication and/or anti-forgery) and/or identification applications, which papers are often hot laminated under pressure.

It is to be noted in this respect that thermochromic ink compositions which cure by ultraviolet radiation are also not compatible with hot lamination methods, the thermochromic activity being destroyed under the action of the heat and/or over time, and produce a far less reactive thermochromic effect which is insufficient in the above-mentioned applications in which the thermochromic components are isolated thermally from the outside by at least one layer, especially a layer of polycarbonate.

In addition, polycarbonate, synthetic papers and security papers are sensitive to most organic solvents and are therefore not compatible with printing using inks based on organic solvents.

Consequently, the suggestions which have been made of incorporating thermochromic motifs into cards—especially of polycarbonate—which are hot laminated under pressure, synthetic papers and security papers as yet constitute only theoretical teaching which cannot be put into practice on an industrial or commercial scale, in particular for producing data carriers which can be used for identification or security purposes.

SUMMARY OF THE INVENTION

Accordingly, the invention aims to remedy those disadvantages by proposing a thermochromic ink composition which simultaneously:
- is compatible with hot lamination at a temperature greater than 150° C., typically of approximately 180° C.,
- is able to adhere strongly to a layer of thermoplastic material, especially of polycarbonate, and/or a synthetic paper and/or to a security paper,
- does not impair the adhesion of the layers of thermoplastic material—especially of polycarbonate—after they have been hot laminated under pressure,
- has a thermochromic effect which is sufficiently reactive that it can be activated through the thickness of at least one protective layer, especially a layer of thermoplastic material—especially of polycarbonate—, or a security film or a layer of synthetic paper or of security paper,
- has a thermochromic effect which lasts for a period of more than 10 years,
- has a thermochromic effect which is resistant to light and to temperature and humidity variations and shocks.

To that end, the invention accordingly relates to a thermochromic ink composition comprising in a liquid medium, named the solvent:
- a dispersion of thermochromic microcapsules incorporating at least one leuco dye, and
- a thermoplastic binder chosen from the group formed of polyacrylic polyesters, polyurethanes, and copolymers thereof, wherein said solvent is aprotic.

Said solvent therefore belongs to the group of aprotic solvents and is in particular free of water and is not an aqueous solvent. It is to be noted that the term "solvent" is used throughout the text to denote, following the example of the terminology used in the field of ink compositions and printing, the liquid medium which forms the basis of the thermochromic ink composition according to the invention, although the liquid medium is not strictly a solvent in the chemical sense of the term, the thermochromic microcapsules being dispersed in the liquid medium and not dissolved therein.

DETAILED DESCRIPTION OF THE INVENTION

The inventors have found that the use of an aprotic solvent in a thermochromic ink composition according to the invention allows thermochromic printing to be obtained which is subsequently compatible with hot lamination under pressure, which has a thermochromic effect which lasts over many years and is sufficiently reactive to be used through at least one thickness of thermoplastic material—especially polycarbonate—, which has excellent adhesion to thermoplastic materials, more particularly to rigid thermoplastic materials at ambient temperature—especially to polycarbonate—and does not impair the adhesion of layers of such plastics materials—especially of polycarbonate—when they are interposed between such layers. The invention also makes it possible to obtain thermochromic printing which is subsequently compatible with synthetic papers and security papers. No clear explanation can be given for this surprising phenomenon which has been found by the inventors. However, it is possible that the aprotic nature of the solvent, although the solvent is normally no longer present when the printing has cured (the solvent having been evaporated off), plays a part in the later resistance of the thermochromic microcapsules to hot lamination under pressure and/or in the working of the leuco dyes. More precisely, it is possible that the protic nature of the aqueous solvents used hitherto in the known thermochromic ink compositions has a considerable effect on the later resistance of the thermochromic microcapsules to hot lamination under pressure and/or on the working of the leuco dyes.

Said aprotic solvent must also be chosen to be compatible with the microcapsules and with the binder, and to be compatible with the printing technique used. Advantageously and according to the invention, the aprotic solvent is chosen from the group of solvents of compositions that are printable by screen printing. Advantageously and according to the invention, said aprotic solvent has at least one of the following features:

- it is chosen from the group of aprotic solvents having a dipole moment of from 0 and 1.9 C·m,
- it is chosen from the group of aprotic solvents having a dielectric constant (vacuum permittivity) of from 1.5 to 11,
- it is chosen from the group of polar aprotic solvents,
- it comprises at least one compound chosen from the group formed of n-alkyl propanoates and propylene glycols (solvents which are particularly compatible with thermochromic microcapsules of melamine formaldehyde).

More particularly, in an advantageous embodiment a thermochromic ink composition according to the invention comprises as solvent a compound chosen from the group formed of n-propyl propanoate, n-butyl propanoate, n-pentyl propanoate, ethyl 3-ethoxypropanoate, 1-methoxy-2-propyl acetate, 1-propoxy-2-propanol, 1-propoxy-2-propyl acetate, 1-butoxy-2-propanol, 1-(2-methoxy-1-methylethoxy)-2-propanol, 1-(2-methoxy-1-methylethoxy)-2-propyl acetate, 1-(2-propoxy-1-methylethoxy)-2-propanol and [2-(2-methoxymethyl-ethoxy)methylethoxy]propanol. Other examples are possible.

In addition, the thermoplastic binder is chosen in particular in dependence on the material serving as the print support for the thermochromic ink composition according to the invention. It is an advantage of the invention that it allows the above-mentioned problems to be solved with a large number of print supports which can be used to receive the thermochromic printing. Accordingly, a thermochromic ink composition according to the invention can be optimized for printing on a support chosen from the group of thermoplastic materials, synthetic papers and security papers. It is to be noted in this respect that a thermochromic ink composition according to the invention can be optimized for printing on a support that is sensitive to solvents, such as polycarbonate supports and security papers.

The thermoplastic binder of a thermochromic ink composition according to the invention can also be optimized for printing on a support which is to be hot laminated under pressure (for example a laminate of thermoplastic layers forming a security and/or identification card such as a bank card).

The thermoplastic binder of a thermochromic ink composition according to the invention can also be optimized to have a long lifetime, especially of several years, for example of at least ten years.

In particular, by way of example, the thermoplastic binder of a thermochromic ink composition according to the invention can be optimized for printing on a support of a thermoplastic material chosen from the group consisting of polycarbonate, PVC and polyesters (polyethylene terephthalate PET, PETG). Other examples are possible.

Advantageously, a thermochromic ink composition according to the invention which is intended more particularly for printing on a support of polycarbonate comprises as binder a thermoplastic resin chosen from the group formed of alkyl poly(meth)acrylates and copolymers thereof.

In particular, by way of example, the thermoplastic binder of a thermochromic ink composition according to the invention can be optimized for printing on a support of synthetic paper chosen from the paper marketed under the trademark Teslin® by PPG, Monroeville, USA, the paper marketed under the trademark Neobond® by Neenah Lahnstein, Lahnstein, Germany, and the paper marketed under the trademark Polyart® by Arjobex, Boulogne, France. Other examples are possible.

In particular, by way of example, the thermoplastic binder of a thermochromic ink composition according to the invention can be optimized for printing on a support of security paper, such as paper for passports, banknote paper, identity card paper, driving license paper, visa paper, birth certificate paper, customs seal paper, etc. Other examples are possible.

In the security and/or identification applications of the invention, the thermoplastic binder of a thermochromic ink composition according to the invention can likewise advantageously be chosen so as to reveal attempts at forgery with solvents (chemical attack), and in particular a binder incorporating an agent that is soluble in the solvents of an adhesive (when the thermochromic ink composition is used to print a thermochromic motif on an adhesive card) as described, for example, by EP 1109675.

In addition, another advantage of a thermochromic ink composition according to the invention is that various additives can be added to the solvent without interfering with the curing of the composition after printing.

In particular, a thermochromic ink composition according to the invention advantageously further comprises at least one anti-UV additive chosen from the group formed of ultraviolet absorbers and light stabilizers (especially of the HALS ("hindered amine light stabilizers") type). Such an ultraviolet absorber and/or light stabilizer of a thermochromic ink composition according to the invention is incorporated into said aprotic solvent and is in particular separate from any ultraviolet absorbers and/or light stabilizers incorporated into the thermochromic microcapsules. Advantageously, a thermochromic ink composition according to the invention comprises from 1 wt. % to 10 wt. %—especially from 2 wt. % to 5 wt. %—of an anti-UV additive.

As the anti-UV additive of a thermochromic ink composition according to the invention there can be used any ultraviolet absorber and/or light stabilizer which is compatible with the other constituents of the composition. There may be mentioned by way of example the group of the 2-(hydroxyphenyl)benzotriazoles (see especially "Ultraviolet stabilizers of the 2-(hydroxyphenyl)benzotriazole class: influence of substituents on structure and spectra" *J. Phys. Chem.*, 1992, 96 (25), pp. 10225-10234); the group of the 2-hydroxyphenyl-s-triazines (see especially U.S. Pat. No. 5,096,489); and the group of the 2,2,6,6-tetramethylpiperidines (TMP) (see especially "oxidation inhibition in organic materials" Jan Pospisil, Peter P. Klemchuk CRC Press, 1989). Advantageously and according to the invention, an ultraviolet absorber can be chosen from the group 2-(2-hydroxyphenyl)-benzotriazole (BTZ) and 2-hydroxyphenyl-s-triazine (HDT).

In an embodiment which is advantageous and according to the invention, the thermochromic ink composition comprises in said solvent from 15 to 35 wt. % thermochromic microcapsules, from 30 to 45 wt. % thermoplastic binder, from 1 to 10 wt. % of at least one anti-UV additive.

The invention extends to a method for producing a card of thermoplastic material—especially of polycarbonate—comprising at least one step of hot lamination under pressure of a plurality of layers of thermoplastic material—especially of polycarbonate—, wherein, before the at least one step of hot lamination under pressure, at least one thermochromic motif is printed on at least one layer of thermoplastic material—especially of polycarbonate—using a thermochromic ink composition according to the invention.

The thermochromic motif can be of any kind: text(s), drawing(s), line(s), etc. It can also be solid print (continuous printing on at least one surface portion of a layer of the card).

Advantageously and according to the invention, at least one thermochromic motif is printed using a thermochromic ink composition according to the invention so as to be interposed between a surface layer of the card and a layer immediately underlying said surface layer. To that end, at least one thermochromic motif is printed using a thermochromic ink composition according to the invention on a surface layer of the card, that is to say on a layer of thermoplastic material—especially of polycarbonate—one face of which constitutes a free face of the card after hot lamination under pressure. Such a thermochromic motif is advantageously printed on a face of said surface layer that is opposite the face of the layer that constitutes the outer free face of the card. In a variant or in combination, at least one thermochromic motif is printed using a thermochromic ink composition according to the invention on a layer immediately underlying a surface layer of the card, especially on a face of the underlying layer that comes into contact with said surface layer after hot lamination under pressure.

The invention extends to a card comprising a plurality of superposed layers of at least one thermoplastic material—especially of polycarbonate—comprising at least one thermochromic motif formed by printing an ink composition according to the invention.

The invention relates also to a thermochromic ink composition, a method for producing a card and a card which are characterized in combination by all or some of the features mentioned hereinabove or hereinbelow.

Other objects, features and advantages of the invention will become apparent upon reading the following examples.

Example 1: Production of a Thermochromic Ink Composition

A thermochromic ink composition is produced by dispersing 20 wt. % of thermochromic microcapsules in a liquid mixture formed of a polar aprotic solvent and a thermoplastic resin.

The thermochromic ink composition comprises:
20 wt. % thermochromic pigments (microcapsules),
40 wt. % methyl methacrylate copolymer as transparent binder,
26 wt. % 1-(2-methoxy-1-methylethoxy)-2-propanol,
10 wt. % ethyl 3-ethoxypropanoate,
4 wt. % 2-hydroxyphenyl-s-triazine (ultraviolet absorber).

The thermochromic microcapsules are microcapsules marketed under the trademark CHAMELEON® by Polychrom Co LTD, Ansan City, Korea.

The ultraviolet absorber is marketed under reference TINUVIN® 400 by BASF, Ludwigshafen, Germany.

The ink has a viscosity of 7.0 Pa·s+/−1 Pa·s.

The ink can be printed using screen-printing screens of 120 threads/cm, permitting fine printing of the type with a matrix of 80 dpi.

Example 2: Production of a Card of Polycarbonate Incorporating Thermochromic Printing An ink composition obtained according to Example 1 is printed in the form of solid print on one of the faces of two sheets of transparent polycarbonate having a thickness of approximately 50 µm.

The ink is dried with hot air.

The printed sheets of polycarbonate are combined with five other sheets of polycarbonate which are interposed between the printed sheets of polycarbonate so as to form a stack, the printed faces being placed in contact with the underlying sheets of the stack, that is to say not constituting the outer faces thereof. The five sheets of polycarbonate which, with the two printed sheets, form said stack are, in succession, as follows: a 100 µm sheet of transparent polycarbonate; a 200 µm sheet of white polycarbonate; a 200 µm sheet of white polycarbonate; a 200 µm sheet of white polycarbonate; a 100 µm sheet of transparent polycarbonate.

The assembly of the sheets forming the stack is laminated in a laminating press under the following conditions:
increase to 180° C. for 1 minute
12 minutes at 180° C. under 30 N/cm$^2$
5 minutes at 180° C. under 150 N/cm$^2$
cooling at 26° C. for 17.5 minutes under 180 N/cm$^2$.

There is obtained a card whose total thickness is equal to the sum of the thicknesses of the sheets of polycarbonate used, reduced by about 10%.

The thermochromic printing produced using the thermochromic ink according to the invention is thus incorporated into the thickness of the card.

Example 3: Adhesion and Durability Tests

Durability tests are carried out on cards of polycarbonate as produced according to Example 2.

The adhesion between the different layers of which the card is composed is evaluated by different test protocols:
measurement of peeling according to standard ISO 10373—90° at 300 mm/minute,
measurement of peeling after weathering according to standards ISO 24789-1 and 2,
flexural test according to standards ISO 24789-1 and 2, 50,000 flexes lengthwise, 50,000 flexes widthwise,
flexural test after weathering according to standards ISO 24789-1 and 2,
flexural test after exposure to artificial light according to standards ISO 24789-1 and 2.

The measurement of peeling shows that the adhesive force between the layers is greater than 3.5 N/cm.

In the flexural tests, no delamination occurs in the region of the layers of polycarbonate surrounding the thermochromic printing.

Example 4: Light Fastness

The light fastness of the cards of polycarbonate as produced according to Example 2 is evaluated by measuring the color difference ($DE*_{Lab}$) of the thermochromic printing before and after exposure to artificial light. The color measurement is carried out when the thermochromic printing is in its first non-activated state, that is to say in the colored version of the thermochromic microcapsules.

The color difference is measured using a spectro-colorimeter (Spectropen® (Dr. Lange, Düsseldorf, Germany)) according to standard ISO 7724-3.

The thermochromic printing is exposed according to three test protocols:
- exposure to UVA: 20 h; UVA 340 nm; 60° C.; 0.72 W/m²/nm (standard ISO 4892),
- exposure to artificial light according to standard OACI 3.2—2006-paragraph 5-14,
- exposure to arc xenon light according to standard ISO 24789-1 and 2.

The color difference DE is less than 10 in the case of exposure to UVA and less than 5 in the case of exposure to artificial light of the xenon arc type.

It is found that the thermochromic activity of the exposed samples, with reversible thermochromic microcapsules which are colored in the non-activated state and transparent in the activated state in terms of the decoloration temperature range and the recoloration temperature range is identical to that of samples that have not been exposed.

Example 5: Resistance to Weathering

The resistance to weathering of the cards of polycarbonate as produced according to Example 2 is evaluated according to the following test protocols:
- exposure to thermal cycles and to stressful storage conditions according to standard OACI 3.2-2006 paragraph 5.2 ("thermal cycling method") and paragraph 5.3 ("storage temperature stress method"),
- exposure to high temperatures and humidity, thermal shock and thermal cycling according to standard ISO 24789-1 and 2, paragraph 5-7 ("temperature and humidity ageing"), paragraph 5-8 ("temperature shock"), paragraph 5-9 ("temperature and humidity cycling").

For the different test protocols. there is no loss of thermochromic activity, in terms of decoloration, change in the level of the decoloration range and the recoloration range.

The invention claimed is:

1. A thermochromic ink composition comprising in a liquid solvent:
    a dispersion of thermochromic microcapsules incorporating at least one leuco dye, and
    a thermoplastic binder chosen from the group formed of polyacrylic polyesters, polyurethanes, and copolymers thereof,
    wherein said solvent is aprotic and comprises at least one compound chosen from the group formed of n-alkyl propanoates, propylene glycols, 1-methoxy-2-propyl acetate, 1-propoxy-2-propanol, 1-propoxy-2-propyl acetate, 1-butoxy-2-propanol, 1-(2-methoxy-1-methylethoxy)-2-propanol, 1-(2-methoxy-1-methylethoxy)-2-propyl acetate, 1-(2-propoxy-1-methylethoxy)-2-propanol and [2-(2-methoxymethyl-ethoxy)methylethoxy]-2-propanol.

2. The composition as claimed in claim 1, wherein said solvent is chosen from the group of aprotic solvents having a dipole moment of from 0 to 1.9 C·m.

3. The composition as claimed in claim 2, wherein said solvent is chosen from the group of polar aprotic solvents.

4. The composition as claimed in claim 2, comprising thermochromic microcapsules of melamine formaldehyde.

5. The composition as claimed in claim 2, comprising as binder a thermoplastic resin chosen from the group formed of alkyl poly(meth)acrylates and copolymers thereof.

6. The composition as claimed in claim 2, further comprising at least one anti-UV additive chosen from the group formed of ultraviolet absorbers and light stabilizers.

7. The composition as claimed in claim 1, wherein said solvent is chosen from the group of aprotic solvents having a dielectric constant of from 1.5 to 11.

8. The composition as claimed in claim 7, wherein said solvent is chosen from the group of polar aprotic solvents.

9. The composition as claimed in claim 7, comprising thermochromic microcapsules of melamine formaldehyde.

10. The composition as claimed in claim 7, further comprising at least one anti-UV additive chosen from the group formed of ultraviolet absorbers and light stabilizers.

11. The composition as claimed in claim 1, wherein said solvent is chosen from the group of polar aprotic solvents.

12. The composition as claimed in claim 1, comprising thermochromic microcapsules of melamine formaldehyde.

13. The composition as claimed in claim 1, comprising as binder a thermoplastic resin chosen from the group formed of alkyl poly(meth)acrylates and copolymers thereof.

14. The composition as claimed in claim 1, further comprising at least one anti-UV additive chosen from the group formed of ultraviolet absorbers and light stabilizers.

15. The composition as claimed in claim 1, comprising from 1 wt. % to 10 wt. % of an anti-UV additive.

16. The composition as claimed in claim 1, comprising in said solvent from 5 to 35 wt. % thermochromic microcapsules, from 30 to 45 wt. % thermoplastic binder, from 1 to 10 wt. % of at least one anti-UV additive.

17. The composition as claimed in claim 1, wherein said solvent is chosen from the group of aprotic solvents having a dielectric constant of from 1.5 to 11.

18. The composition as claimed in claim 1, wherein the n-alkyl propanoates are chosen from the group consisting of n-propyl propanoate, n-butyl propanoate, n-pentyl propanoate and ethyl 3-ethoxypropanoate.

19. A method for producing a card of thermoplastic material comprising at least one step of hot lamination under pressure of a plurality of layers of thermoplastic material,
    wherein, before the at least one step of hot lamination under pressure, at least one thermochromic motif is printed on at least one layer of thermoplastic material using a thermochromic ink composition comprising in a liquid solvent said solvent being aprotic:
    a dispersion of thermochromic microcapsules incorporating at least one leuco dye, and
    a thermoplastic binder chosen from the group formed of polyacrylic polyesters, polyurethanes, and copolymers thereof.

20. The method as claimed in claim 19, wherein the at least one thermochromic motif is printed so as to be interposed between a surface layer of the card and a layer immediately underlying said surface layer.

21. The method as claimed in claim 19, wherein the at least one thermochromic motif is printed on at least one layer of polycarbonate.

22. A card comprising a plurality of superposed layers of at least one thermoplastic material comprising at least one thermochromic motif formed by printing an ink composition comprising in a liquid solvent said solvent being aprotic:
   a dispersion of thermochromic microcapsules incorporating at least one leuco dye, and
   a thermoplastic binder chosen from the group formed of polyacrylic polyesters, polyurethanes, and copolymers thereof.

\* \* \* \* \*